(12) United States Patent
Horiuchi et al.

(10) Patent No.: US 12,289,015 B2
(45) Date of Patent: Apr. 29, 2025

(54) MOTOR ARMATURE STRUCTURE AND MOTOR ARMATURE MANUFACTURING METHOD

(71) Applicant: SANYO DENKI CO., LTD., Tokyo (JP)

(72) Inventors: Manabu Horiuchi, Tokyo (JP); Shintarou Koichi, Tokyo (JP); Yasushi Misawa, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 13 days.

(21) Appl. No.: 17/667,227

(22) Filed: Feb. 8, 2022

(65) Prior Publication Data
US 2022/0271578 A1    Aug. 25, 2022

(30) Foreign Application Priority Data

Feb. 22, 2021   (JP) ................. 2021-026178

(51) Int. Cl.
*H02K 1/16* (2006.01)
*H02K 1/14* (2006.01)
*H02K 15/02* (2025.01)

(52) U.S. Cl.
CPC ............... *H02K 1/16* (2013.01); *H02K 1/148* (2013.01); *H02K 15/024* (2013.01)

(58) Field of Classification Search
CPC ........ H02K 1/16; H02K 1/148; H02K 15/024; H02K 15/08; H02K 1/02; H02K 15/02
See application file for complete search history.

(56) References Cited

U.S. PATENT DOCUMENTS

| 4,719,377 A * | 1/1988 | Horie ............... H02K 1/02 310/44 |
| 5,722,032 A * | 2/1998 | Gay .................. B22F 1/065 419/36 |
| 8,110,959 B2 | 2/2012 | Hultman et al. |
| 10,491,072 B2 | 11/2019 | Kitamura et al. |
| 2006/0232160 A1 * | 10/2006 | Kanno ............. H02K 15/022 310/216.016 |

(Continued)

FOREIGN PATENT DOCUMENTS

| CN | 111049285 A * | 4/2020 | ............. H02K 1/02 |
| JP | 60-187244 A | 9/1985 | |

(Continued)

OTHER PUBLICATIONS

Watanabe et al., "Thin and High-Torque Axial Gap Motor Using Soft Magnetic Powder Cores", Sumitomo Electric Industries, Ltd., Technical Review, 2018, vol. 192, No. 86, pp. 106-112, total 14 pages; Cited in Specification; English Translation.

(Continued)

*Primary Examiner* — Jeffrey T Carley
*Assistant Examiner* — Jose K Abraham
(74) *Attorney, Agent, or Firm* — RANKIN, HILL & CLARK LLP

(57) ABSTRACT

There is provided a motor armature structure including an armature that includes: a winding body; an armature core having a plurality of winding cores; and a structure framework, at least a part of the structure framework includes an insulating member, and the armature core includes a molded magnetic material admixture.

16 Claims, 8 Drawing Sheets

(56) References Cited

U.S. PATENT DOCUMENTS

| | | | |
|---|---|---|---|
| 2007/0114870 A1* | 5/2007 | Lee ................ | H02K 17/20 310/44 |
| 2007/0222306 A1* | 9/2007 | Hultman ............ | H02K 1/146 310/44 |
| 2008/0143197 A1* | 6/2008 | Lee ................ | B22F 5/106 310/44 |
| 2010/0141059 A1* | 6/2010 | Nishimura .......... | H02K 1/02 310/44 |
| 2013/0313922 A1* | 11/2013 | Kim ................ | H02K 3/522 310/44 |
| 2014/0312729 A1* | 10/2014 | Kim ................ | H02K 1/165 310/112 |
| 2015/0229166 A1 | 8/2015 | Miyashita et al. | |
| 2015/0340913 A1* | 11/2015 | Cho ................ | F04D 19/002 310/216.092 |
| 2016/0156255 A1* | 6/2016 | Kim ................ | H02K 1/148 310/208 |
| 2017/0063172 A1* | 3/2017 | Shiohara .......... | H02K 1/02 |
| 2017/0187252 A1* | 6/2017 | Takahashi ......... | H02K 3/524 |
| 2017/0264159 A1 | 9/2017 | Kitamura et al. | |
| 2018/0138760 A1* | 5/2018 | Kim ............... | H02K 1/148 |
| 2020/0176183 A1 | 6/2020 | Korhonen et al. | |
| 2021/0013760 A1* | 1/2021 | Enomoto .......... | H02K 3/493 |

FOREIGN PATENT DOCUMENTS

| | | |
|---|---|---|
| JP | H09215245 A | 8/1997 |
| JP | 10-229652 A | 8/1998 |
| JP | 2003-309944 A | 10/2003 |
| JP | 2004-254421 A | 9/2004 |
| JP | 2006-345650 A | 12/2006 |
| JP | 2016103929 A | 6/2016 |
| JP | 6280761 B2 | 2/2018 |
| JP | 2019180217 A | 10/2019 |
| WO | 2005/109603 A1 | 11/2005 |

OTHER PUBLICATIONS

Extended European Search Report (EESR) dated Aug. 2, 2022 for European Patent Application No. 22154834.0.
Japanese Office Action (JPOA) issued on Sep. 9, 2024 for Japanese Patent Application No. 2021-026178.

* cited by examiner

MOTOR ARMATURE STRUCTURE AND MOTOR ARMATURE MANUFACTURING METHOD

CROSS-REFERENCE TO RELATED APPLICATION

This application is based on Japanese Patent Application No. 2021-026178 filed with the Japan Patent Office on Feb. 22, 2021, the entire content of which is hereby incorporated by reference.

BACKGROUND

1. Technical Field

The present disclosure relates to a motor armature structure and a motor armature manufacturing method.

2. Related Art

In an armature of a motor, generally, a soft magnetic steel plate, which is a representative electromagnetic steel plate, is processed to form an armature core having a predetermined shape. Moreover, a winding slot wall of a winding frame made of resin, a winding frame being referred to as an insulator or bobbin, is provided with an insulating wall. Furthermore, an electric wire with an insulating coating thereon is wound around a tooth portion to configure a pole. An iron compound having magnetic performance that has been improved by an additive is stretched out thin to form an electromagnetic steel plate. An insulating layer is provided on the surface of the electromagnetic steel plate. In this manner, there is a device for ensuring predetermined performance also during lamination at the subsequent stage. A sheet is cut out from the electromagnetic steel plate having the insulating layer by various processing methods such as wire cutting and a dedicated blanking mold. Such sheets are laminated to form an armature core of a motor. On the basis of the characteristic of this manufacturing method, any cross section that is exposed when the armature core is cut in a direction perpendicular to the axis of rotation has substantially the same shape.

As such a motor armature core structure, an armature core structure having a three-dimensional magnetic circuit structure is proposed in Japanese Patent No. 6280761. In the armature core structure, armature core sheets having partially different cross-sectional shapes, which are formed by use of a devised blanking mold, are mixed and laminated. However, laminating the armature core sheets in such a manner as to change the shape of the armature core structure to a desired shape is difficult due to manufacturing constraints.

In contrast, a case where an armature core of a motor is formed by use of a dust core is reported in Asako Watanabe et al., "Thin and High-Torque Axial Gap Motor Using Soft Magnetic Powder Cores," SEI Technical Review, no. 192 (January 2018): 119-125. Various soft magnetic powder materials are compressed and molded in a mold under high pressure to form a dust core. An armature core can be formed by use of the dust core. However, as long as there is the operation of removing the material from the mold, it is difficult to adhere to general motor design that, for example, increases the area of a pole on the basis of an enlarged tooth tip and increases torque.

As another point of view, generally, motor performance can be improved by facilitating the winding of wires of a motor and introducing more wires in a slot. Hence, various armature core sheet forms are known. For example, a coil that is wound in advance can be inserted into an armature core in which a pole surface that touches a rotor is not enlarged into a flange shape but is formed in a straight shape instead. Hence, the straight shape is a shape determined by the manufacturing constraints described above. However, from the viewpoint of, for example, the number of wires, the straight shape has advantages of a high fill factor of copper wire and of simplicity of manufacturing.

However, it is generally known that in a motor, the flange at the tip of the pole is enlarged to cause more magnetic flux to work and therefore exhibit the effect of an increase in torque or prevention of torque ripple. Hence, generally, the pole tip is enlarged in many cases, which is detrimental to the ease of winding. Hence, for example, the employment of a structure that allows easy winding by employing a divisible structure to facilitate the insertion of a coil, or by dividing an armature core itself is also proposed in JP-A-2006-345650.

However, a magnetic circuit through which magnetic flux passes is still separated somewhere in this structure. Hence, for example, torque is reduced, or subtle misalignment occurs on a joint portion. As a result, the entire magnetic distribution becomes unbalanced. Hence, this structure is fraught with various problems including abnormally high frequency of cogging torque.

SUMMARY

A motor armature structure according to embodiments of the present disclosure includes an armature including: a winding body; an armature core having a plurality of winding cores; and a structure framework. At least a part of the structure framework includes an insulating member, and the armature core includes a molded magnetic material admixture.

BRIEF DESCRIPTION OF DRAWINGS

FIG. 3B is a cross-sectional view of the structure framework taken along A-A in

FIG. 3A;

FIG. 5B is a cross-sectional view of the completed armature taken along A-A in

FIG. 5A;

DETAILED DESCRIPTION

Figure 1A:
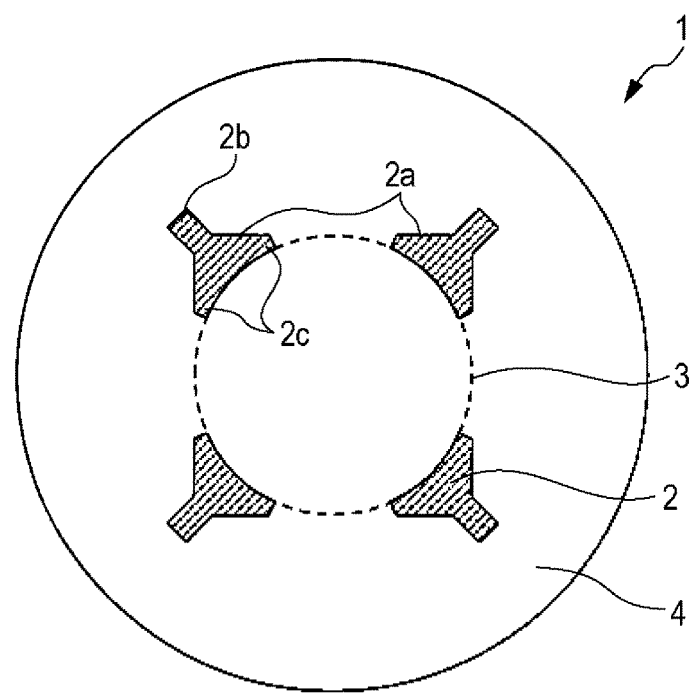
FIG. 1A is a transparent front view of a structure framework included in a motor armature structure according to one embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In order to solve such problems, an object of the present disclosure is to provide a motor armature structure that allows flexible configuration of an armature core having a desired structure without compromising motor performance due to, for example, a reduction in torque or an increase in cogging torque, and a method for manufacturing the same.

A motor armature structure that is provided by the embodiments is as follows:

Provided is a motor armature structure including an armature that includes: a winding body; an armature core having a plurality of winding cores; and a structure framework, wherein at least a part of the structure framework includes an insulating member, and the armature core includes a molded magnetic material admixture.

Moreover, more specifically, the motor armature structure may have structures enumerated below:

The structure framework may include two end plates at positions apart from each other on an axis of rotation of the armature.

At last a part of the winding body may be held by a positioning portion placed on the structure framework along a direction of the axis of rotation of the armature.

At least a part of the structure framework may extend in such a manner as to define a space where the winding core of the winding body is placed.

At least a part of the structure framework may cover an outer peripheral side of the winding body.

At least a part of the structure framework may form an insulation portion between the winding body and the winding core.

Furthermore, a method for manufacturing a motor armature that is provided by the embodiments is as follows:

Provided is a motor armature manufacturing method including: providing a plurality of winding bodies wound around an air core as a space where a winding core is located; placing the plurality of winding bodies in a structure framework; and molding the air core, the winding bodies, and the structure framework with a magnetic material admixture with fluidity including a mixture of a resin binder and a soft magnetic powder, wherein at least a portion, which defines the air core, of the structure framework includes an insulating material.

Moreover, more specifically, the armature manufacturing method may be manufacturing methods enumerated below:

The winding body may be molded in advance with the magnetic material admixture.

The magnetic material admixture may include a fluid material or a liquid material.

The magnetic material admixture may include a granular material or a pellet.

The magnetic material admixture may be formed with a 3D printer.

The structure framework and the magnetic material admixture may be simultaneously formed three-dimensionally.

In at least a part of steps, a cored bar, an inner mold, or an outer mold may be used.

The cored bar or the inner mold may be used to position the structure framework, upon the plurality of winding bodies being placed in the structure framework.

With the motor armature structure and method for manufacturing the same according to the embodiments, a motor armature structure that allows flexible configuration of an armature core having a desired structure without compromising motor performance due to, for example, a reduction in torque or an increase in cogging torque, and a method for manufacturing the same are provided.

Figure 1B:
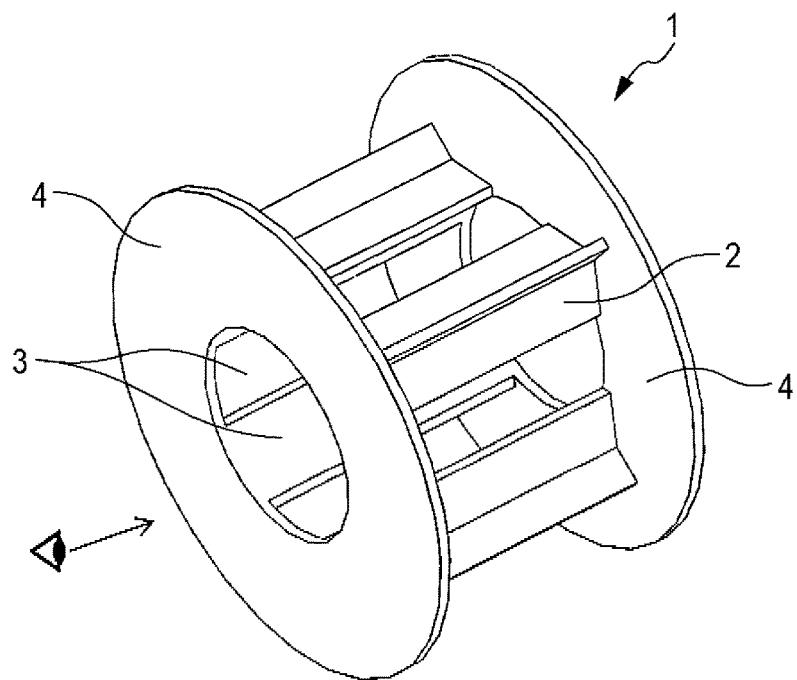
FIG. 1B is a perspective view of the structure framework.

FIG. 1A illustrates a front view of a structure framework 1 included in a motor armature structure according to one embodiment (a first embodiment), that is, a transparent view as viewed in an axial direction of the structure framework 1. The armature configures a part of a motor. The armature includes winding bodies 10 (described below), an armature core 20 (described below) including a plurality of winding cores, and the structure framework 1. FIG. 1B is a perspective view of the structure framework 1.

In FIGS. 1A and 1B, the structure framework 1 includes, in at least a part thereof, an insulating member made of a material with insulation properties, that is, an insulating material. Furthermore, the structure framework 1 includes two armature end portions on planes orthogonal to the axis of the motor (which indicates the axis of rotation of the motor below irrespective of various motor forms). Each end portion includes a circular end plate 4 that is placed at a position away from the end plate 4 of the other end portion on the axis of rotation of the armature.

The same number (four in this example) of straight positioning portions 2 as the winding bodies 10 are placed between the two end plates 4 along a direction of the axis of rotation, that is, in such a manner as to link the two end plates. The positioning portions 2 allow holding the plurality of winding bodies 10 described below at predetermined positions in such a manner that the winding bodies 10 do not protrude outward from the outer edges of the end plates.

The positioning portion 2 is placed a fixed distance away from the adjacent positioning portion 2, on a concentric circle 3 about the axis of the motor. An inner peripheral surface, which is located on the concentric circle 3, of the positioning portion 2 has an arc shape to fit on a circular cored bar for positioning, or an outer peripheral surface of an inner mold. This allows exerting a positioning effect when the plurality of winding bodies 10 is placed in the structure framework 1.

The cross section of the positioning portion 2 has a substantially triangular shape as viewed in the axial direction of the motor. A flange portion 2c is formed on each side of a surface (bottom surface) on the motor axis side, that is, on the inner peripheral side.

Moreover, a boundary portion 2b is formed on the vertex of the triangular shape facing the bottom surface, as an insulating member that protrudes in a direction opposite to the direction of the axis of the motor, that is, outward, to separate the adjacent winding bodies from each other.

The flange portion 2c of the positioning portion 2 includes, on the outer peripheral side thereof, a positioning surface 2a to determine the position of one winding body. The positioning surface 2a is in the same plane as the positioning surface 2a of the adjacent positioning portion 2. The bottom surface of the winding body 10 is brought into contact with the positioning surface 2a. The side surface of the winding body 10 is brought into contact with the boundary portion 2b. The winding body 10 is positioned in this manner and then placed in the structure framework 1.

A space is formed between the flange portions 2c of the plurality of positioning portions 2. This space is filled with a magnetic material admixture configuring the winding body 10 (including a case where the winding body 10 includes a penetration portion), or an armature core 20, which are described below.

Figure 2A:
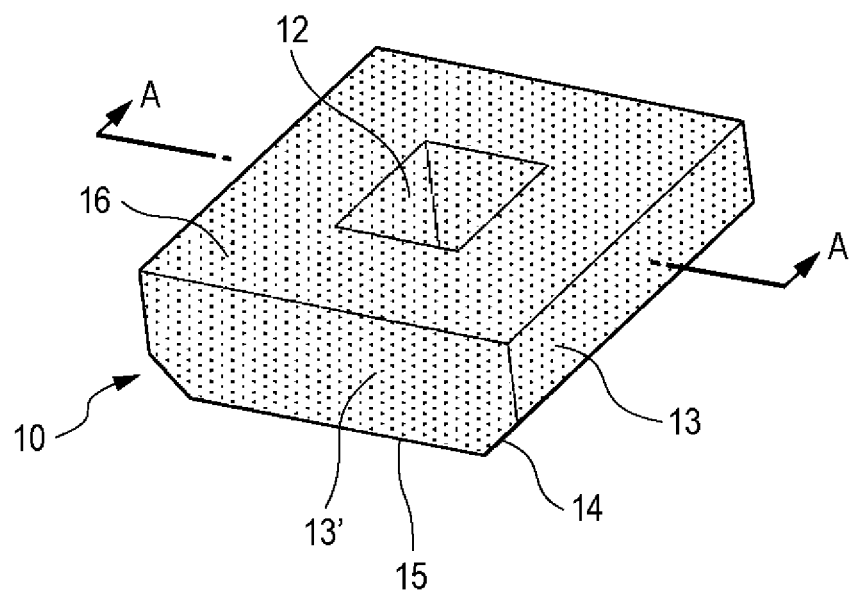
FIG. 2A is a perspective view of a winding body included in the motor armature structure according to the one embodiment.
Figure 2B:
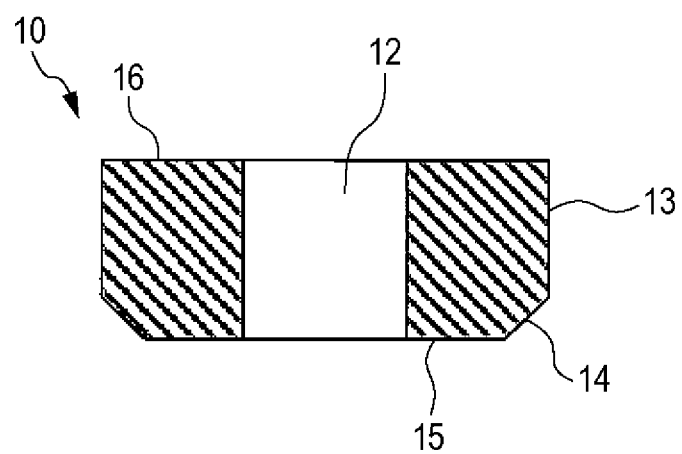
FIG. 2B is a cross-sectional view of the winding body taken along A-A in FIG. 2A, the winding body being assembled to the structure framework illustrated in FIGS. 1A and 1B.

FIG. 2A illustrates a perspective view of the winding body 10 used in the first embodiment, which is assembled to the structure framework 1 illustrated in FIGS. 1A and 1B. FIG. 2B is an A-A cross-sectional view of the winding body 10.

As illustrated in FIGS. 2A and 2B, although not illustrated, only (a coil of) wire that is wound around an air core as a part where the winding core is located is formed into a fixed shape in the winding body 10. The winding body 10 is molded with, for example, resin to maintain the shape. In this manner, the winding body 10 is formed as an integral block.

In the example of FIG. 2A, all the wires configuring the winding body 10 are molded in advance with resin. However, not all the wires may be molded with resin. Moreover, no wires may be molded with resin. For example, if the wire has an insulating coating such as enamel thereon, the insulation properties can be ensured by the coating per se. However, the wire is covered with an insulating member by, for example, molding, and therefore, the insulation properties can be ensured more reliably. A cored bar, an inner mold, or an outer mold can be used as appropriate to perform positioning before molding, or to make the molded shape uniform.

In this example, the winding body 10 having a substantially cuboid cross section is used. As viewed from a top surface 16 in the drawing, that is, the outer peripheral side of the armature, the entire winding body 10 has a cuboid shape and is formed in a substantially hollow square shape. In other words, a through hole 12, which has a cuboid shape in the cross-sectional view in FIG. 2B, is formed in the center of the winding body 10.

The details are described. As illustrated in FIG. 2B, the winding body 10 includes the top surface 16 on a side opposite to the motor axis side, that is, on the outer peripheral surface side, and a bottom surface 15 on the motor axis side, that is, on the inner peripheral surface side. The through hole 12 that penetrates the winding body 10 is formed in the center of the winding body 10 between the top surface 16 and the bottom surface 15.

Moreover, a side surface 13 facing in the circumferential direction, and a side surface 13' facing in a direction that is square to the side surface 13 are formed on the outer side of the winding body 10. Both surfaces are formed in a substantially planar shape.

Furthermore, a slope 14 of a bevel shape is formed between the side surface 13 and the bottom surface 15. A large part of the side surface 13' in the center on the bottom surface 15 side simply intersects the bottom surface 15. Both end portions of the side surface 13' in the circumferential direction on the bottom surface side intersect the slope 14. The side surface 13' also has a substantially planar shape.

The slope 14 and the bottom surface 15 of the winding body 10 each come into contact with the above-mentioned boundary portion 2b and positioning surface 2a of the structure framework 1. In this manner, the winding body 10 is positioned and placed. In this example, the side surface 13 of the winding body 10 has a shape that protrudes toward the side opposite to the motor axis side, that is, outward, beyond the boundary portion 2b of the structure framework 1.

Figure 3A:
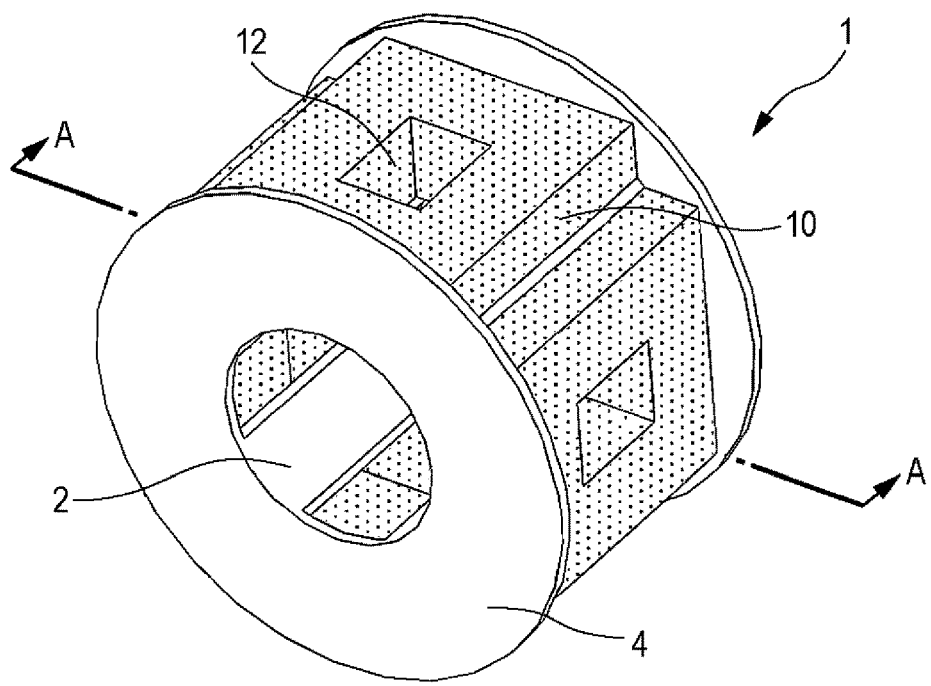
FIG. 3A is a perspective view of the structure framework illustrated in FIGS. 1A and 1B, in which the winding body illustrated in FIGS. 2A and 2B is placed.
Figure 3B:
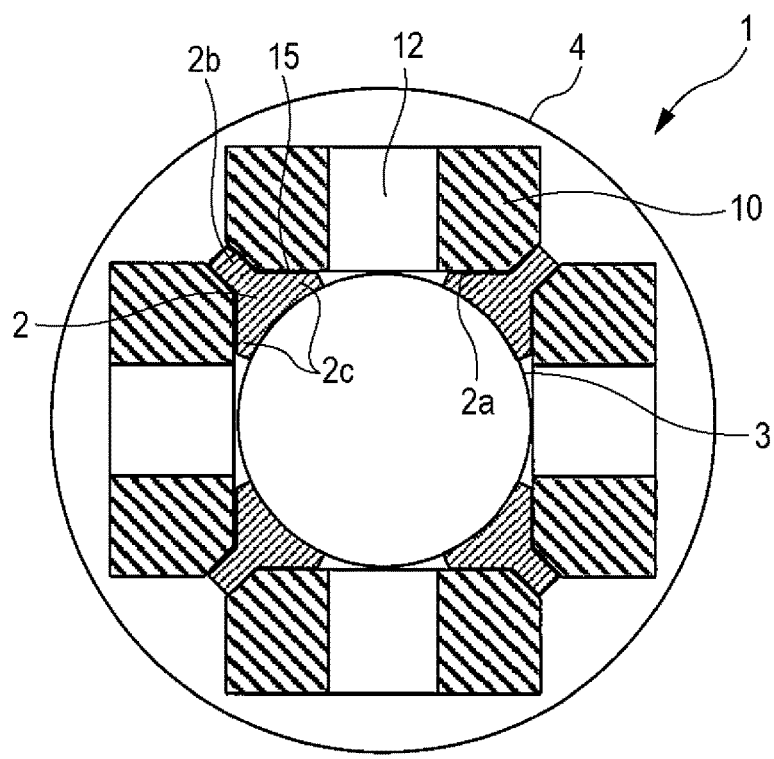

FIG. 3A is a perspective view of the structure framework 1 illustrated in FIGS. 1A and 1B. The winding bodies 10 illustrated in FIGS. 2A and 2B are placed, assembled to the structure framework 1. FIG. 3B is an A-A cross-sectional view of the structure framework 1 with the winding bodies 10 thereon. Properly speaking, the end plates 4 should not be illustrated in the A-A cross-sectional view. However, the end plates 4 are illustrated for reference to clarify the positional relationships.

The placement and structure of each member are as described above.

Figure 4A:
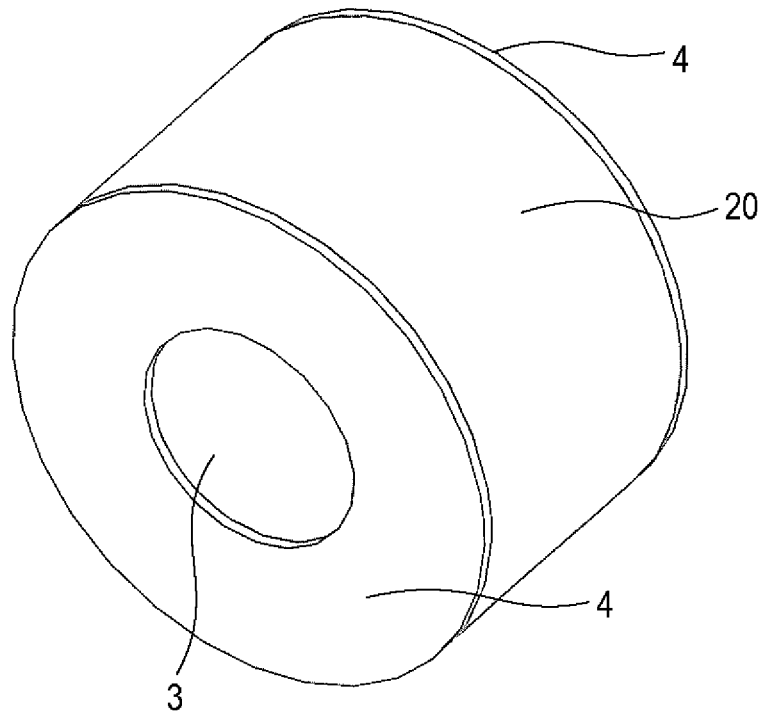
FIG. 4A is a perspective view of the armature structure according to the one embodiment, including the structure framework and the winding body, which are illustrated in FIGS. 1A to 3B.
Figure 4B:
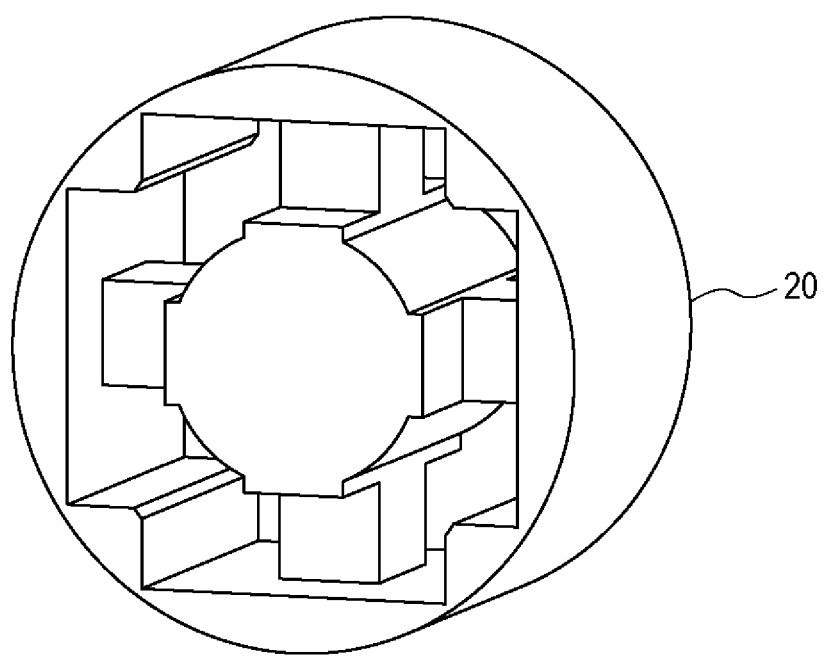
FIG. 4B is a perspective view illustrating only an armature core part removed from the armature structure.

FIG. 4A is a perspective view of the armature used in the first embodiment, including the structure illustrated in FIGS. 1A to 3B. FIG. 4B is a perspective view illustrating only the magnetic material admixture of the armature.

Return to FIGS. 3A and 3B. A space around the axis of the motor is defined by flat portions of both end plates 4 of the structure framework 1. Moreover, a space that spreads outward from the axis of the motor is defined by the outer edges of both end plates 4.

The magnetic material admixture as a continuous material configuring the armature core 20 is filled and cured in the spaces that are defined in this manner, the spaces excluding spaces occupied by the positioning portions 2 of the structure framework 1 and by the winding bodies 10. A magnetic powder is mixed in, for example, a polymer resin binder with fluidity in the magnetic material admixture. The filling and curing step uses a known means for molding such as insert molding. The magnetic material admixture may be a liquid admixture, or an admixture with fluidity. Other admixtures can also be selected as the magnetic material admixture as appropriate.

The magnetic material admixture is filled and cured also in the concentric circle 3 including the axis of the motor. However, there is no problem in placing any component including a bar or shaft that supports or fixes the armature, other wiring, or a board inside the concentric circle 3, according to the structure of the motor.

The motor armature that is formed in this manner is illustrated in FIG. 4A.

FIG. 4B illustrates a perspective view of only the armature core 20 including the magnetic material admixture, which has been removed from the motor armature having the configuration illustrated in FIGS. 1A to 4A. As is clear from FIG. 4B, only the shape of an armature of an outer rotor motor is illustrated. It is difficult to realize the structure of such an armature of the outer rotor motor by a general manufacturing method.

The magnetic powder included in the magnetic material admixture used here may be any of known soft magnetic materials such as 3% Si—Fe, an amorphous material, Sendust, and a nanocrystalline material. These alloys are processed by various known milling methods such as atomization, a mechanical process, and a chemical process to produce soft magnetic powders. These soft magnetic powders are mixed in polymer binder resin to form fillers.

These resins can take various forms such as liquid, powder, or pellets before curing. However, all the resins are the same as known general molding resins in the respect of curing by heat and forming a resin solid. After curing, a material that transmits magnetic flux on the basis of the properties of the soft magnetic material filled in is complete.

Figure 5A:
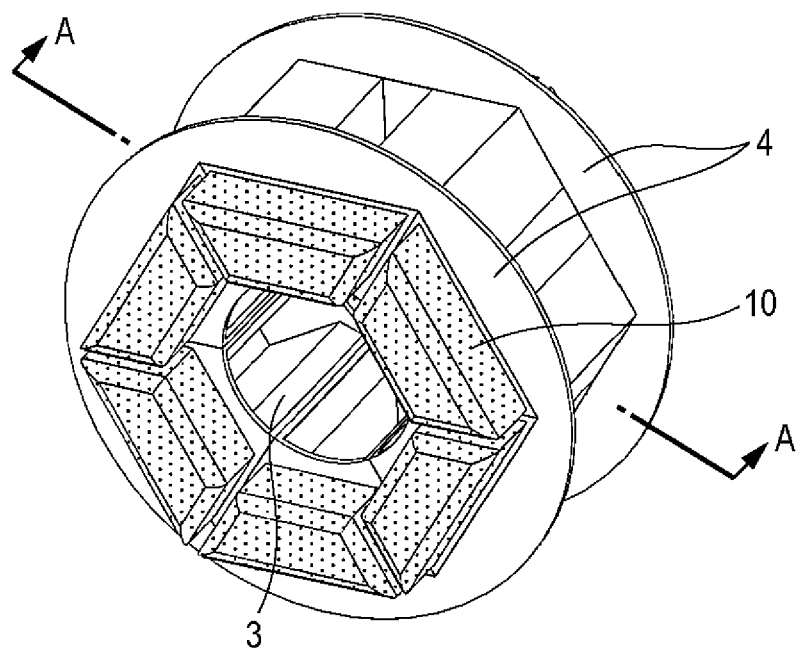
FIG. 5A is a perspective view of a structure framework including winding bodies, the structure framework being included in a motor armature structure according to another embodiment.
Figure 5B:
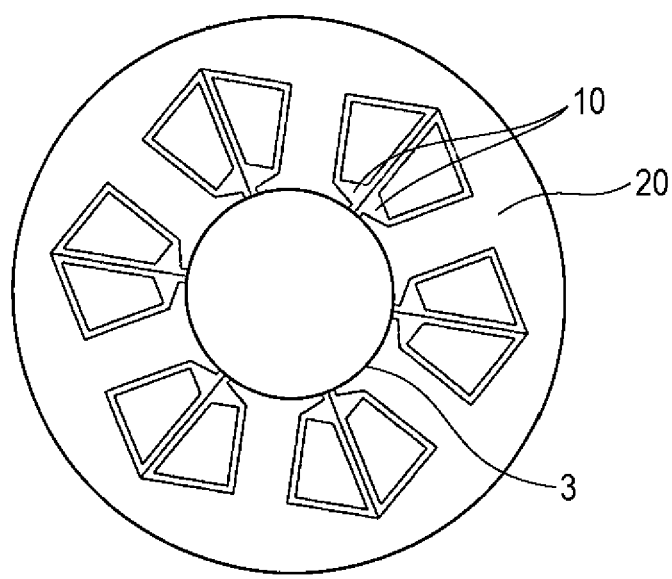

FIGS. 5A and 5B illustrate an example of an inner rotor motor as another embodiment (a second embodiment). FIG. 5A is a perspective view of the inner rotor motor. For the sake of understanding the internal structure, the armature core 20 is omitted. FIG. 5B is an A-A cross-sectional view of the completed armature. The armature core 20 is clearly illustrated.

Figure 6A:
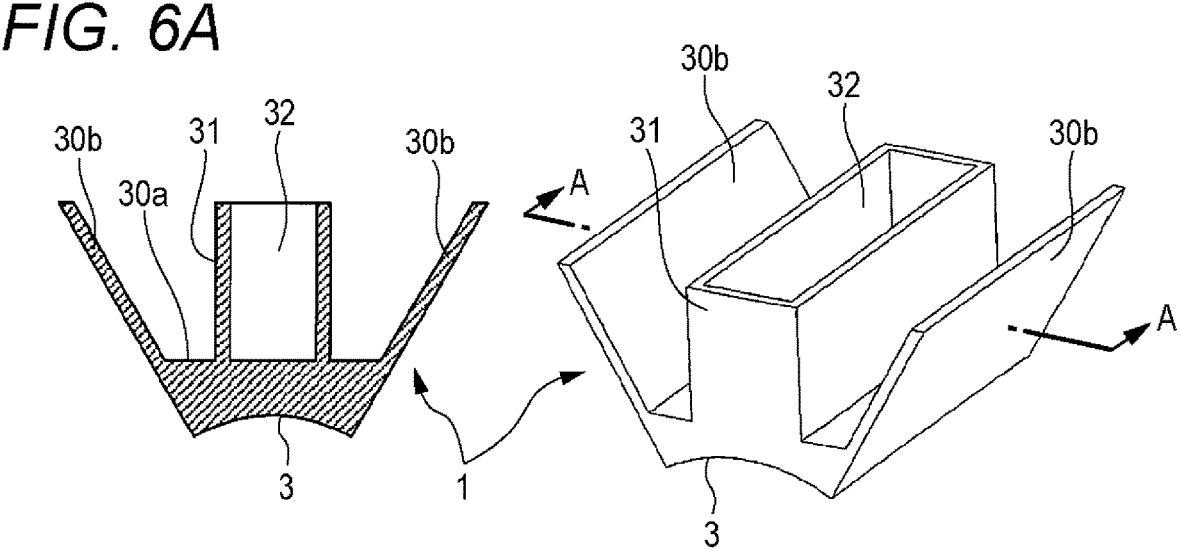
FIG. 6A is a perspective view of a part of the structure framework illustrated in FIG. 5A, and an A-A cross-sectional view of the part.
Figure 6B:
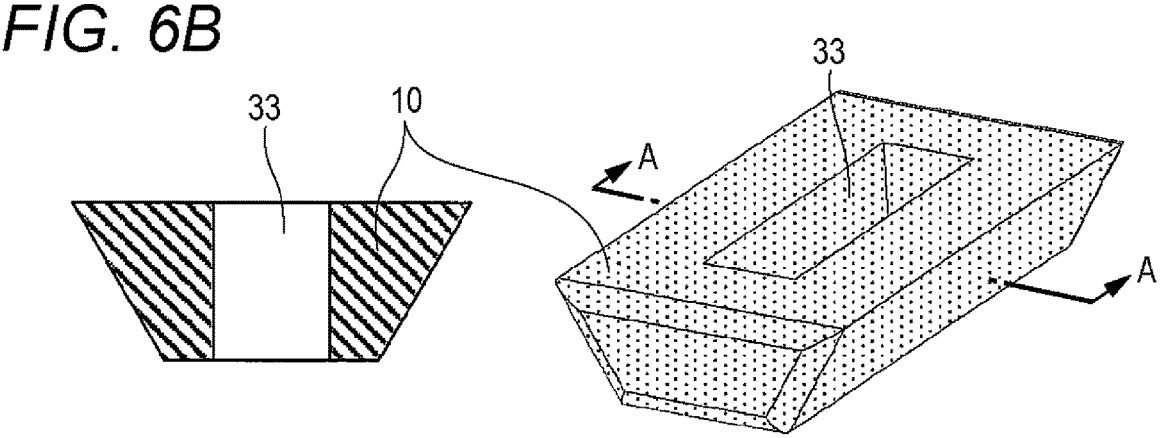
FIG. 6B is a perspective view of a part of the winding bodies illustrated in FIG. 5A, and an A-A cross-sectional view of the part.
Figure 6C:
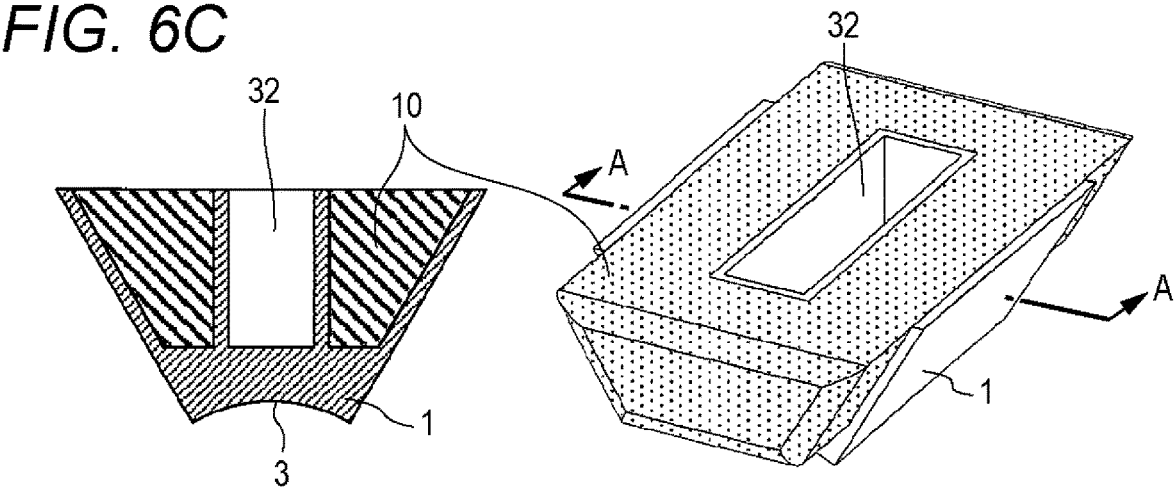
FIG. 6C is a perspective view of a part of the structure framework including the winding bodies, which is illustrated in FIG. 5A, and an A-A cross-sectional view of the part.

FIG. 6A shows a detailed perspective view of a structure framework 1 configuring an armature of FIGS. 5A and 5B, and an A-A cross-sectional view of the structure framework 1. FIG. 6B shows a detailed perspective view of a winding body 10 configuring the armature, and an A-A cross-sectional view of the winding body 10. FIG. 6C shows a detailed perspective view of the structure framework 1 including the winding body 10, and an A-A cross-sectional view of the structure framework 1 including the winding body 10. These configurations are illustrated as an example of a six-slot motor. Each of the structure framework 1, the winding body 10, and the structure framework 1 including the winding body 10, which are illustrated in FIGS. 6A to 6C, is formed in a set of six.

One set of the structure framework 1, the winding body 10, and the structure framework 1 including the winding body 10 is described below. The remaining five sets have the same structure. Descriptions of parts similar to the above-mentioned outer rotor motor are omitted.

Boundary portions 30b extending radially outward are formed at two end portions of the structure framework 1 illustrated in FIG. 6A, as viewed in cross section. The structure framework 1 is placed in close proximity to the boundary portion 30b of the structure framework 1 in an adjacent slot.

The entire structure framework 1 is formed into a substantially cuboid shape as viewed from the outer peripheral side of the motor. The longitudinal direction of the cuboid is the same as the axial direction of the motor. Moreover, a bottomed winding core space 32 is formed in the same longitudinal direction. A compartment wall 31 that is made of an insulating member and encloses the winding core space 32 along the winding direction is formed in such a manner that the winding core space 32 coincides with the winding core portion of the coil. A magnetic material admixture is filled in the winding core space 32 to configure a winding core.

The boundary portions 30b and the compartment wall 31, together with a bottom surface 30a made of an insulating member, define a space for housing the winding body. The space for housing the winding is open at two end faces orthogonal to the axis of the motor.

The boundary portions 30b, the compartment wall 31, and the bottom surface 30a as a whole position and hold the winding body 10 to be housed. As a result, a positioning portion 2 for the winding body 10 is formed. Moreover, these members are made of insulating materials, and prevent, for example, a short circuit. The boundary portions 30b and the compartment wall 31 are not necessarily required to extend to the outer peripheral end surface of the winding body 10. The boundary portions 30b and the compartment wall 31 may be formed only on a side closer to the bottom surface 30a depending on the circumstances. In this manner, the heights (widths) of the boundary portions 30b and the compartment wall 31 in the radial direction can be set as appropriate.

Furthermore, a thick base portion that extends further inward from the bottom surface 30a is formed on the inner peripheral side of the structure framework 1, that is, on the motor axis side. The inner peripheral side is formed into an arc-shaped surface located on a concentric circle 3 about the axis of the motor.

The inner peripheral sides of six sets of the adjacent structure frameworks 1 are substantially continuous. As a result, the inner peripheral surface of the armature is configured on the concentric circle 3.

FIG. 6B illustrates the winding body 10 to be housed in the structure framework 1 illustrated in FIG. 6A. The winding body 10 is formed into a substantially inverted truncated cone in cross section. A through hole 33 that fits on the compartment wall 31 is formed in the center. The winding body 10 has a structure similar to the above-mentioned form.

FIG. 6C illustrates the winding body 10 illustrated in FIG. 6B, which is housed in the structure framework 1 illustrated in FIG. 6A.

The length of the winding body 10 in the longitudinal direction as viewed in the axial direction of the motor is greater than the length of the structure framework 1 in the longitudinal direction. This is because, as can be understood from the perspective view of the whole in FIG. 5A, the winding body 10 has a shape that protrudes in the axial direction of the motor from end plates 4, which touch the end portions of the structure framework 1, of the armature of the motor. This shape allows the magnetic flux to converge. As a result, a rotor having a shorter dimension in the longitudinal direction enables an improvement in motor performance.

Figure 7:
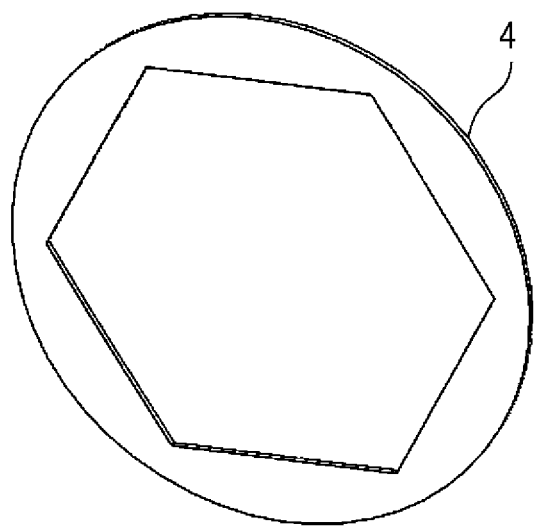
FIG. 7 is a perspective view of an end plate of a structure framework included in a motor armature structure according to one embodiment.

FIG. 7 illustrates an example of the end plate 4.

Figure 8:
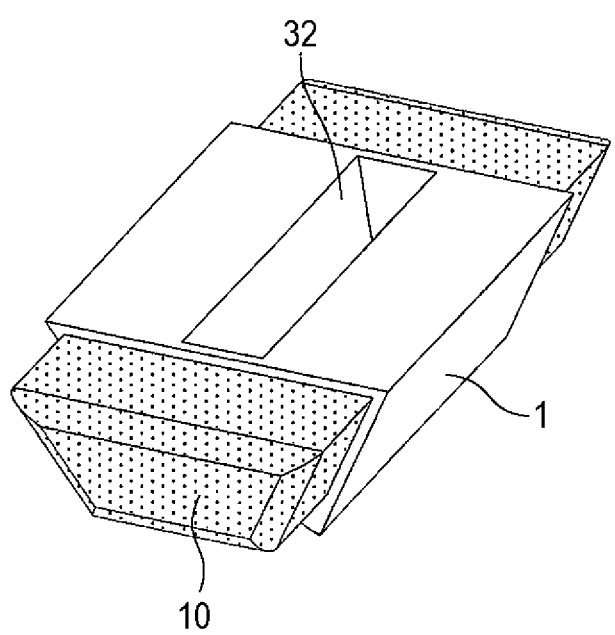
FIG. 8 is a perspective view of a part of a structure framework including winding bodies, which is used in still another embodiment.

FIG. 8 illustrates a winding body 10 used in still another embodiment (a third embodiment). In the embodiment, a part of the structure of the winding body 10 in FIG. 6B is modified. In contrast to the winding body 10 in FIG. 6B, the outer peripheral side of the winding body 10 is also covered with a structure framework 1 in this example. In this case, the structure framework 1 may be formed with an outer peripheral side member and an inner peripheral side member, which are obtained by dividing the structure framework 1 that covers the winding body 10 into two parts: upper and lower, and together form the shape of the structure framework 1. In this case, the two divided halves sandwich the winding body 10 from above and below. Therefore, the structure illustrated in FIG. 8 can be obtained. The form of the division can be changed as appropriate. Hence, the form is not limited to the division into two parts. Moreover, as another form of the division into two parts, for example, the boundary portions 30b and the compartment wall 31, which are integral with the framework 1, such as the one illustrated in FIG. 6A, may be covered with a separate flat plate from above (from the outer peripheral side). Conversely, the boundary portions 30b and the compartment wall 31 may be formed on such a separate flat plate. Furthermore, the boundary portions 30b and the compartment wall 31 may be partially formed on the framework 1 and the flat plate.

Figure 9:
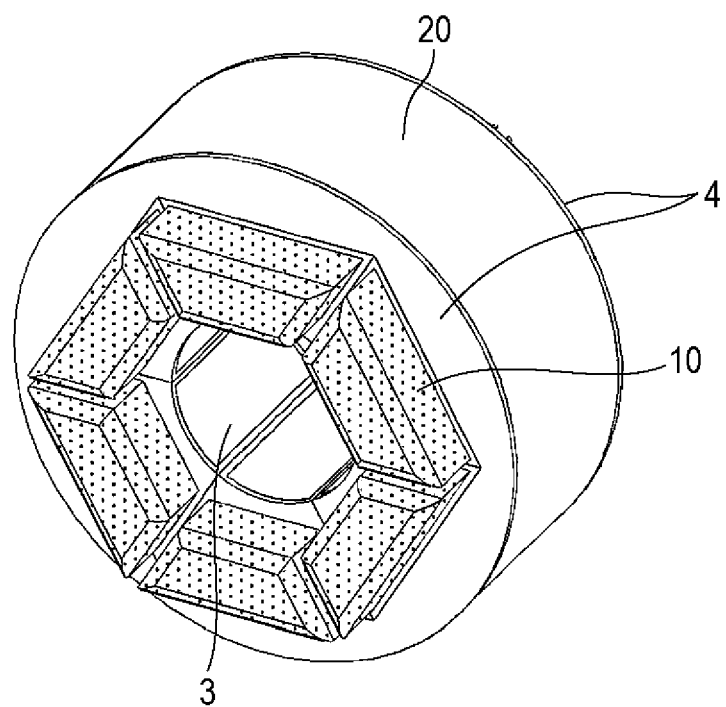
FIG. 9 is a perspective view of an armature used in the embodiment including the structure illustrated in FIGS. 5A to 6C or FIG. 8.

FIG. 9 is a perspective view of the armature used in the second or third embodiment described above. In FIG. 9, the winding bodies 10 with the structure illustrated in FIGS. 5A to 7 or with the structure including the winding body 10 illustrated in FIG. 8 are assembled to the structure framework 1. The magnetic material admixture as a continuous material configuring an armature core 20 is filled and cured in spaces excluding spaces occupied by positioning portions 2 of the structure framework 1 and by the winding bodies 10. A magnetic powder is mixed in, for example, a polymer resin binder with fluidity in the magnetic material admixture.

In terms of the outer shape, the winding body 10 has the shape that protrudes in the axial direction of the motor from the end plates 4, which touch two end portions of the structure framework 1, of the armature of the motor. The other parts of the armature are configured similarly to the armature used in the first embodiment, which is illustrated in FIGS. 1A to 4B.

As described above, the specific structure of each embodiment has been described. In short, it is simply required to fill and cure the magnetic material admixture as the continuous material configuring the armature core 20 in all or part of gaps created by assembling the winding bodies 10 and the arbitrary structure framework 1 as appropriate. A magnetic powder is mixed in a polymer binder with fluidity in the magnetic material admixture.

Therefore, it is simply required to form the structure framework 1 and the winding bodies 10 in accordance with an ideal or optimal configuration for exerting preset desired motor performance.

As the binder of the magnetic material admixture, for example, a mixture of a liquid epoxy resin and a magnetic powder is conceivable. As this resin, a wide variety of resins can be used irrespective of the type of the polymer such as a thermoset or thermoplastic. Moreover, manufacturing by injection molding by use of pellet resin before curing is also possible. Moreover, the armature core may be formed by, for example, curing or baking with a granular admixture including a mixture of a granular resin and a magnetic powder, the granular admixture being filled in the mold.

Moreover, the binder resin including the magnetic material admixture may be a material that is cured instantaneously by some type of external stimulus, the material being used by, for example, a 3D printer. In this case, for example, the winding of the armature and the pedestal-shaped structure framework, which are provided in advance, are set in the 3D printer. This allows forming, with the 3D printer, a bobbin around a coil, the bobbin acting as an insulating layer, and the armature core of the magnetic material admixture. Consequently, it is also possible to manufacture the motor with the 3D printer. Moreover, it is also possible to form the structure framework and the magnetic material admixture three-dimensionally at the same time.

The above embodiments are not limited to, for example, the illustrated configurations. The above embodiments can be modified as appropriate within the scope where the effects of the embodiments are exerted. In addition, the embodiments include an embodiment including a configuration provided by modifying and carrying out the embodiment as appropriate, or freely selecting the constituent elements of the embodiment.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A motor armature structure comprising an armature including:
   a plurality of winding bodies, each of the plurality of winding bodies including a wire wound around an air core where a respective one of a plurality of winding cores is positioned, each of the plurality of winding bodies being formed as an integral block;
   an armature core having the plurality of winding cores; and
   a structure framework,
      wherein the structure framework includes a plurality of positioning portions, each extending along a direction of the axis of rotation of the armature and having at least one boundary portion as an insulating member, said at least one boundary portion protruding outwardly in a direction opposite to the direction of an axis of the motor;
      wherein the plurality of winding bodies are held by the plurality of positioning portions, respectively, such that the adjacent winding bodies are separated from each other by the at least one boundary portion in between the adjacent winding bodies and at least a part of a bottom surface of each of the adjacent winding bodies is in contact with a positioning surface of one of the positioning portions and at least a part of a side surface of each of the adjacent winding bodies is in contact with the at least one boundary portion;
      wherein the armature core includes a molded magnetic material admixture that integrates the plurality of winding bodies and the structure framework;
      wherein the plurality of winding bodies and the structure framework both are molded by the magnetic material admixture;
      wherein the plurality of winding bodies includes first and second winding bodies;
      wherein the plurality of positioning portions includes first, second and third positioning portions;
      wherein the first winding body is in contact with the first and second positioning portions and held by the first and second positioning portions; and
      wherein the second winding body is in contact with the second and third positioning portions and held by the second and third positioning portions.

2. The motor armature structure according to claim 1, wherein the structure framework includes two end plates at positions apart from each other on an axis of rotation of the armature.

3. The motor armature structure according to claim 1, wherein at least a part of the structure framework extends in such a manner as to define a space where the winding core of the winding body is placed.

4. The motor armature structure according to claim 1, wherein at least a part of the structure framework covers an outer peripheral side of the winding body.

5. A motor armature manufacturing method for manufacturing the motor armature structure according to claim 1, comprising:
providing the plurality of winding bodies;
providing the structure framework that includes the plurality of positioning portions;
placing the plurality of winding bodies in the structure framework, such that the adjacent winding bodies are separated from each other by the at least one boundary portion in between the adjacent winding bodies and at least the part of the bottom surface of each of the adjacent winding bodies is in contact with the positioning surface of one of the positioning portions and at least the part of the side surface of each of the adjacent winding bodies is in contact with the at least one boundary portion; and
molding the air core, the winding bodies, and the structure framework with the magnetic material admixture with fluidity including a mixture of a resin binder and a soft magnetic powder.

6. The motor armature manufacturing method according to claim 5, wherein after the step of providing the winding bodies and the step of placing each of the winding bodies in the structural framework, each winding body is molded with the magnetic material admixture.

7. The motor armature manufacturing method according to claim 5, wherein the magnetic material admixture includes a fluid material or a liquid material.

8. The motor armature manufacturing method according to claim 5, wherein the magnetic material admixture includes a granular material or a pellet.

9. The motor armature manufacturing method according to claim 5, wherein the magnetic material admixture is formed with a 3D printer.

10. The motor armature manufacturing method according to claim 9, wherein the structure framework and the magnetic material admixture are simultaneously formed three-dimensionally.

11. The motor armature manufacturing method according to claim 5, wherein in at least a part of steps, a cored bar, an inner mold, or an outer mold is used.

12. The motor armature manufacturing method according to claim 11, wherein the cored bar or the inner mold is used to position the structure framework, upon the plurality of winding bodies being placed in the structure framework.

13. The motor armature structure according to claim 1, wherein a portion of the molded magnetic material admixture is filled in the air core.

14. The motor armature structure according to claim 1, wherein spaces that excluding spaces occupied by the plurality of positioning portions of the structure framework and by the plurality of winding bodies are filled with the molded magnetic material admixture as a continuous material configuring the armature core such that the plurality of winding bodies and the structure framework both are molded by the magnetic material admixture.

15. A motor armature structure comprising an armature including:
a plurality of winding bodies, each of the plurality of winding bodies including a wire wound around an air core where a respective one of a plurality of winding cores is positioned, each of the plurality of winding bodies being formed as an integral block;
an armature core having the plurality of winding cores; and
a structure framework,
wherein the structure framework includes a plurality of positioning portions, each extending along a direction of the axis of rotation of the armature and having two boundary portions as insulating members, said two boundary portions extending radially outward as viewed in an axial direction of the motor;
wherein the plurality of positioning portions include a first positioning portion and a second positioning portion adjacent to the first positioning portion;
wherein one of the two boundary portions of the first positioning portion is in contact with one of the two boundary portions of the second positioning portion;
wherein the plurality of winding bodies are held by the plurality of positioning portions, respectively, such that the adjacent winding bodies are separated from each other by the two boundary portions in between the adjacent winding bodies and at least a part of a bottom surface of each of the adjacent winding bodies is in contact with a bottom surface of one of the positioning portions and at least a part of a side surface of each of the adjacent winding bodies is in contact with the one of the two boundary portions;
wherein the armature core includes a molded magnetic material admixture; and
wherein a portion of the molded magnetic material admixture is filled in the air core.

16. A motor armature structure comprising an armature including:
a plurality of winding bodies, each of the plurality of winding bodies including a wire wound around an air core where a respective one of a plurality of winding cores is positioned, each of the plurality of winding bodies being formed as an integral block;
an armature core having the plurality of winding cores; and
a structure framework having a cuboid shape as viewed from an outer peripheral side of the motor, a longitudinal direction of the cuboid shape is the same as an axial direction of the motor,
wherein the structure framework includes a plurality of positioning portions, each extending along a direction of the axis of rotation of the armature and having at least one boundary portion as an insulating member, said at least one boundary portion protruding outwardly in a direction opposite to the axial direction of the motor;
wherein the plurality of winding bodies are held by the plurality of positioning portions, respectively, such that the adjacent winding bodies are separated from each other by the at least one boundary portion in between the adjacent winding bodies and at least a part of a bottom surface of each of the adjacent winding bodies is in contact with a bottom surface of one of the positioning portions and at least a part of a side surface of each of the adjacent winding bodies is in contact with the at least one boundary portion;
wherein the armature core includes a molded magnetic material admixture; and
wherein the molded magnetic material admixture is a continuous material configuring the armature core, filled and cured in spaces that excluding spaces occupied by the plurality of positioning portions of the structure framework and by the plurality of winding bodies.

* * * * *